United States Patent [19]
Manuli

[11] Patent Number: 5,654,499
[45] Date of Patent: Aug. 5, 1997

[54] DUAL CARCASS FLEXIBLE HOSE

[75] Inventor: Dardanio Manuli, Milan, Italy

[73] Assignee: Manuli Rubber Industries S.r.l., Ascoli Piceno, Italy

[21] Appl. No.: 502,761

[22] Filed: Jul. 14, 1995

[30] Foreign Application Priority Data

Jul. 15, 1994 [IT] Italy .................. TO94A0575

[51] Int. Cl.$^6$ .................. G01M 3/18; F16L 33/01
[52] U.S. Cl. .................. 73/40.5 R; 340/605; 138/104
[58] Field of Search .................. 73/40, 40.5 R, 73/49.1; 340/605, 604; 200/61.04, 61.05; 137/312, 551, 557; 138/104, 140, 148

[56] References Cited

U.S. PATENT DOCUMENTS

| | | | |
|---|---|---|---|
| 2,043,857 | 6/1936 | Montgomery | 340/605 |
| 2,432,367 | 12/1947 | Andresen | 340/605 X |
| 3,562,731 | 2/1971 | Jui-Cheng Hsu | 340/604 |
| 4,246,575 | 1/1981 | Purtell et al. | 340/605 |
| 4,414,441 | 11/1983 | Perry et al. | 200/61.04 |
| 5,463,377 | 10/1995 | Kronberg | 340/605 |

FOREIGN PATENT DOCUMENTS

| | | |
|---|---|---|
| 0535997 | 4/1993 | European Pat. Off. . |
| 2233223 | 1/1975 | France . |
| 2099952 | 12/1982 | United Kingdom . |
| 2138917 | 10/1984 | United Kingdom . |

*Primary Examiner*—Michael Brock
*Attorney, Agent, or Firm*—Sughrue, Mion, Zinn, Macpeak & Seas

[57] ABSTRACT

A dual carcass flexible hose comprising a first carcass for conveying the fluid and a secondary carcass surrounding the first carcass in such a way as to define a space for retention of the fluid and in which the first and secondary carcasses are connected at each end to a flanged metal tubular connector having an annular metal element surrounding the tubular connector adjacent its flanged end and defining, between its wall and the outer surface of the connect or, an annular chamber in fluid communication with the space between the first and secondary carcass, and a leakage detector device for detecting leakage of the conveyed fluid from the first to the secondary carcass, disposed in fluid communication with the said annular chamber.

15 Claims, 5 Drawing Sheets

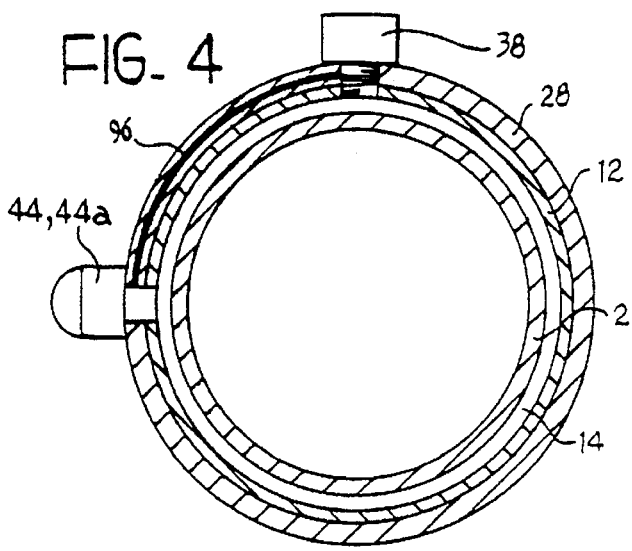
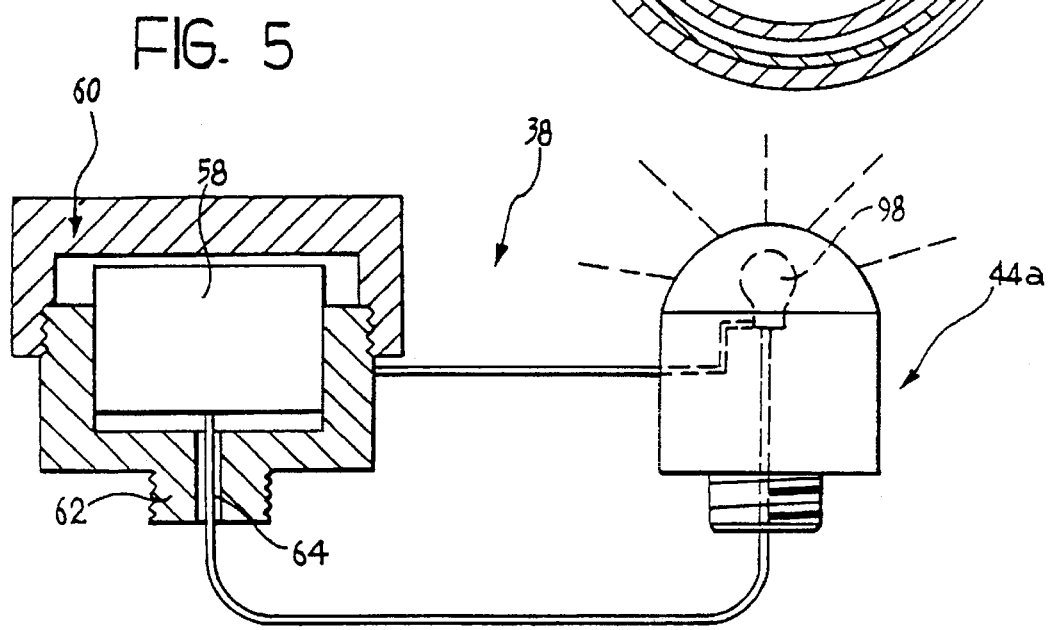
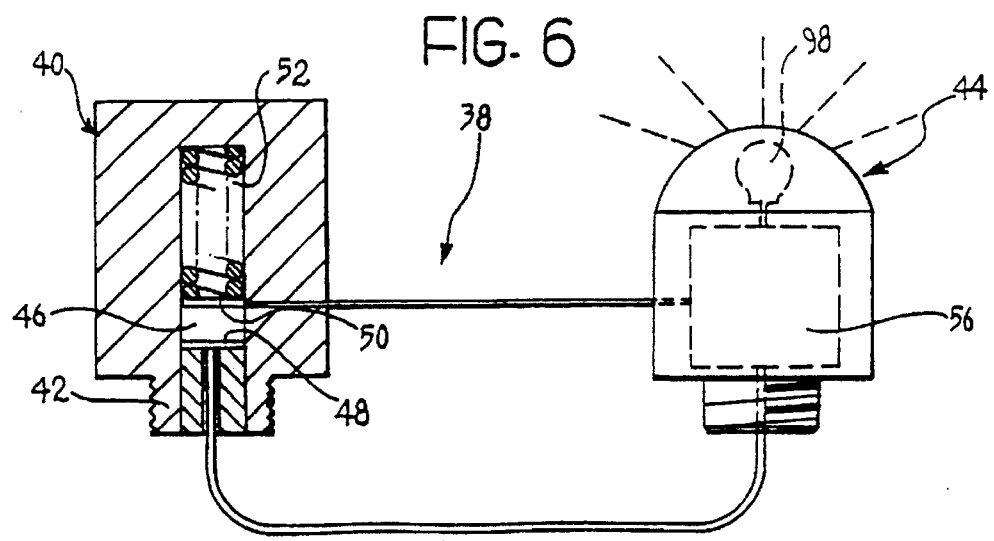

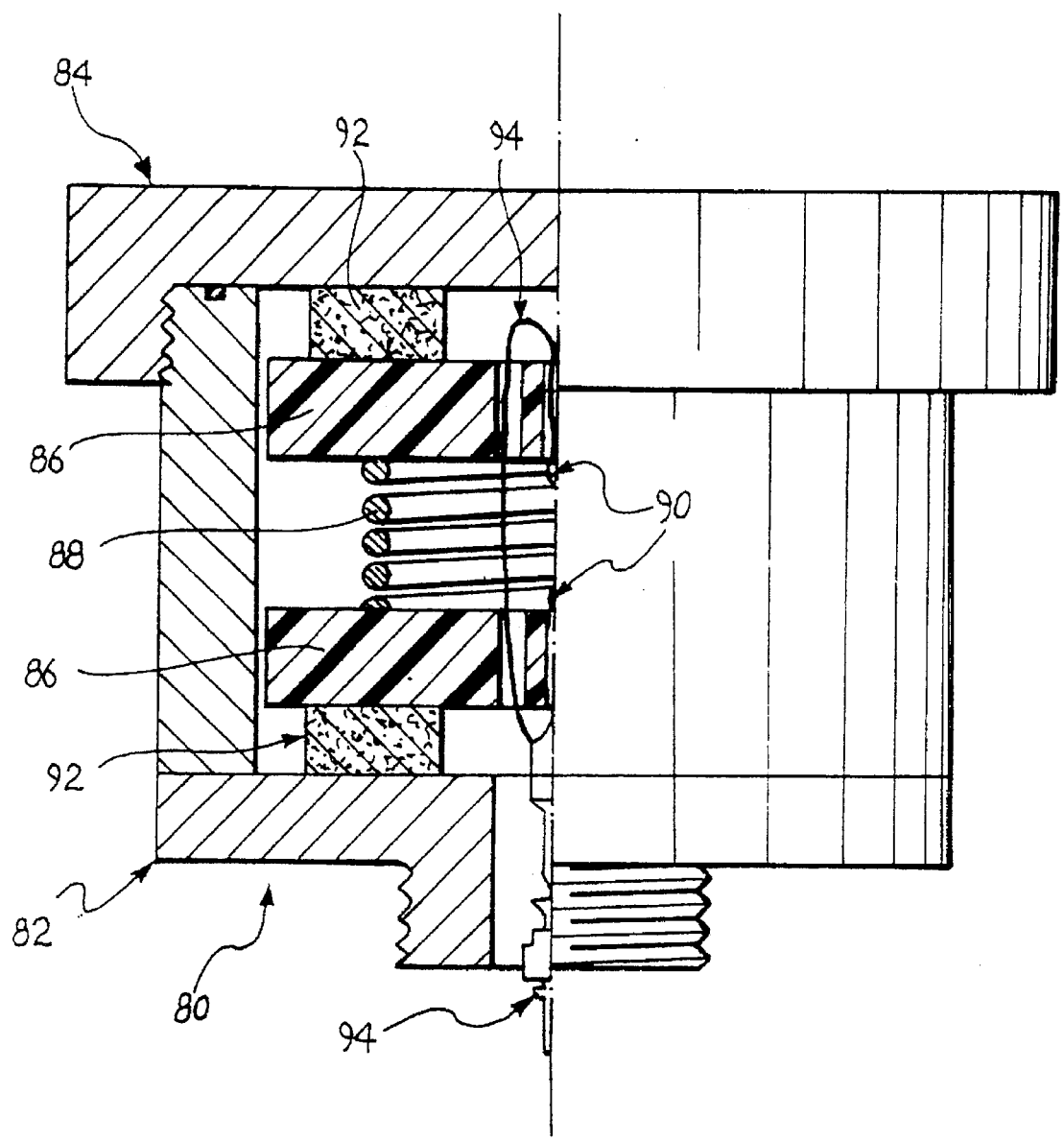

DUAL CARCASS FLEXIBLE HOSE

BACKGROUND OF THE INVENTION

The present invention relates to a dual carcass flexible hose of the type comprising a first carcass for conveying fluid and a secondary carcass surrounding the first carcass in such a way as to define a space for the retention of the fluid and in which the first and secondary carcasses are connected, at each end, to a flanged metal tubular connector.

Flexible hoses of the above-mentioned type are widely utilised for the transport of fluids such as oil-rich fluids, the escape of which would constitute a serious risk for the environment and public health, whenever the hose is subjected, during use, to significant forces of flexure and in general to particularly severe manipulation conditions.

Prior art flexible hoses of the above-mentioned type are normally provided with leak detector devices operable to indicate an escape of the conveyed fluid from the first carcass and its ingress into the secondary carcass which functions as retainer; even if the secondary carcass is made in such a way as to withstand the pressure of the fluid being conveyed, the emission of an alarm signal by means of a leak detector is essential to make it possible to act promptly to replace the damaged hose before a failure occurs leading to consequent escape of fluid from the secondary carcass.

Known devices for the detection of leakages use the radial expansion of the secondary carcass or the increase of pressure in the secondary carcass which occurs upon loss of fluid from the first carcass, in order to provide a detectable signal.

SUMMARY OF THE INVENTION

The present invention provides a flexible hose of the above-indicated type, provided with a leakage detector device which can provide an alarm signal resulting from the presence of the conveyed fluid in the secondary carcass, independently of the threshold values of radial expansion of the secondary carcass or the pressure of fluid in the secondary carcass. The subject of the invention thus comprises a dual carcass flexible hose of the above indicated type, characterised in that it includes a metal annular element surrounding the said tubular connector adjacent its flanged end and defining, between its wall and the outer surface of the connector, an annular chamber in fluid communication with the space between the first and secondary carcass and a device for detecting leakage of the conveyed fluid from the first carcass into the secondary carcass, disposed in fluid communication with the said annular chamber, said leakage detector device comprising a sensor means adapted to generate a signal when contacted by fluid irrespective of threshold values of the radial expansion of the secondary carcass or of the pressure of fluid in the secondary carcass.

BRIEF DESCRIPTION OF THE DRAWINGS

Further characteristics and advantages of the flexible hose according to the invention will become apparent during the course of the following detailed description, given purely by way of non-limitative example, with reference to the attached drawings, in which:

FIG. 4 is a view taken on the line IV—IV of FIG. 3; and

FIGS. 5, 6 and 7 are partially sectioned views of leakage detector devices intended to be connected to the hose of the invention.

DETAILED DESCRIPTION OF THE INVENTION

Figure 1:
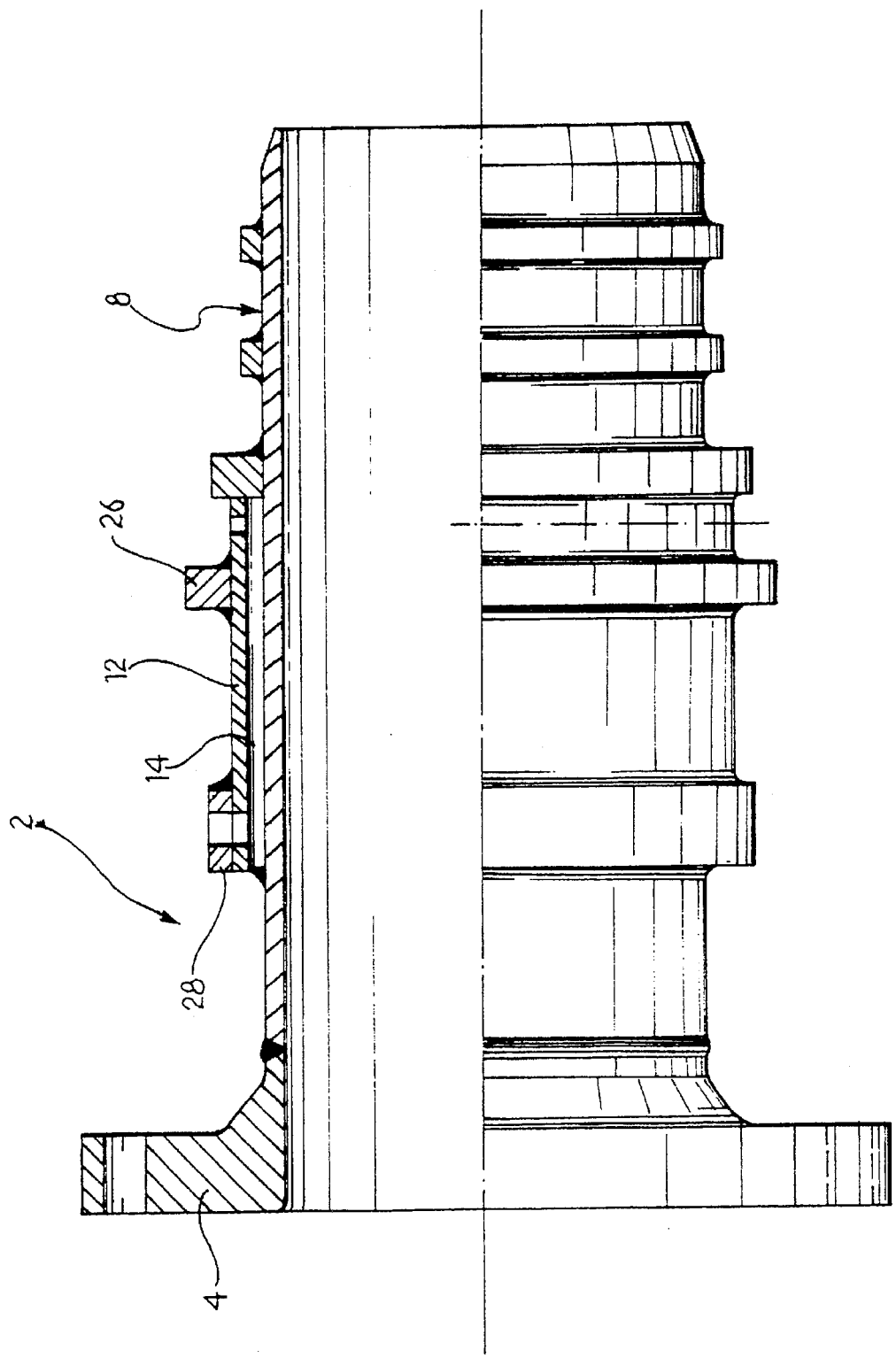
FIG. 1 is a partially sectioned view of a tubular connector for the flexible hose according to the invention.

With reference to the drawings, the reference numeral 2 indicates a tubular metal connector or nipple connected to each end of the flexible hose and provided with a radial flange 4 for connection to another hose element.

A first carcass, generally indicated 6 (FIG. 2) is sealingly fixed to the tubular connector 2 in a threaded end region 8 which has on its outer surfaces a plurality of radially projecting ribs 10.

Figure 2:
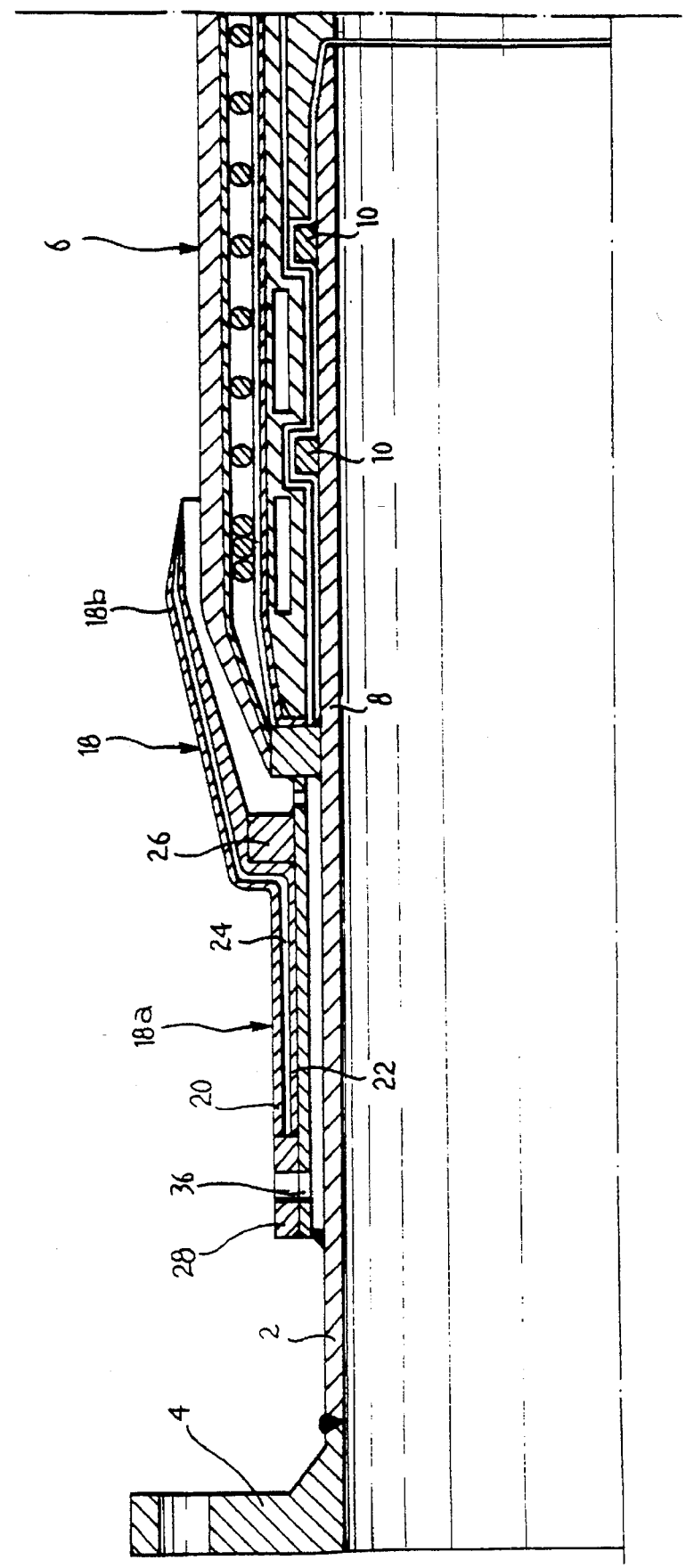
FIG. 2 is a sectional view of a middle part of the flexible hose according to the invention.
Figure 3:
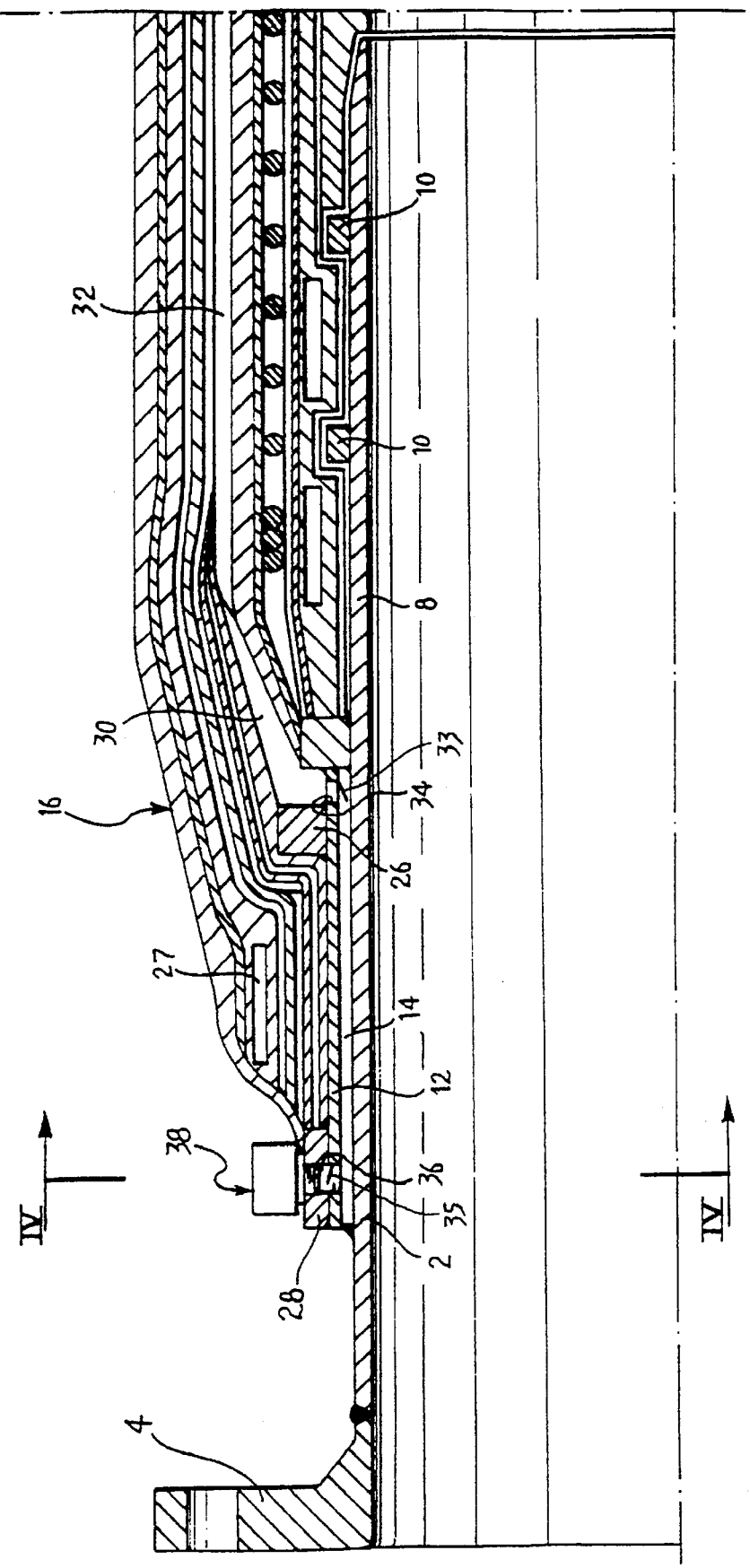
FIG. 3 is a sectional view of the flexible hose according to the invention.

The first carcass 6 is made in a manner known per se and is formed by an inner cladding which is impermeable to the fluid to be conveyed, at least one reinforcement structure formed by various spiral wound steel wire frames and a cover, as illustrated for example in FIGS. 2 and 3.

Adjacent its flanged end the tubular connector 2 is welded to an annular metal element 12 which defines an annular chamber 14 between its wall and the outer surface of the wall of the tubular connector 2.

The secondary carcass, generally indicated 16, surrounding the first carcass 6, is connected sealingly to the outer surface of the said annular element 12 directly or (as illustrated in the drawings) with the interposition of an annular element 18 formed by a plurality of layers 20, 22 of synthetic rubber resistant to oil, and by a hose breaker 24 impregnated with synthetic rubber. The annular element 18 has a cylindrical tubular portion 18a which engages on the surface of the annular element 12 between two radially projecting ribs 26, 28 and a flared portion 18b with a tongue-like section which extends under the first carcass 6. The element 18 functions as anchorage for the sealing connection of the secondary carcass 16. The anchorage of the secondary carcass to the annular element 12 is ensured by means of a fastening 27. The secondary carcass is made in a manner known per se by an inner cladding, a reinforcement structure and an outer cladding.

Between the first and secondary carcasses 6, 16 there is defined a space 30 into which the fluid escaping from the first carcass 6 can flow in the case of failure of the first carcass. The space 30 may be filled with an open cell expanded synthetic material generally indicated 32.

The space 30 is in communication with the annular chamber 14 via one or more radial apertures 34 which allow the fluid to flow into the said annular chamber 14. In one embodiment of the present invention the space 30 communicates with the annular chamber by means of one or more non-return valves 33 which allow unidirectional access into the annular chamber 14 for the conveyed fluid. The chamber 14 is in fluid communication, via one or more radial apertures 36 having a one-way valve 35, with a leakage detector device 38 which engages a threaded hole communicating through the aperture 36 with the chamber 14.

The leak detector devices preferably comprises two separate components: a hose sensor or "trigger" device and an alarm indicator device; in operation the hose sensor detects the leak and activates the alarm.

In a first embodiment the leakage detector device 38 comprises fluid sensor means consisting of a level indicator of type known per se, arranged to send a signal to an alarm device when the level of fluid in the chamber 14 reaches a predetermined value.

In another embodiment the leakage detector device 38 comprises a fluid operated switch 40, disposed in fluid communication with the annular chamber 14 and able to close an electric circuit to an alarm indicator device 44 when contacted directly by the conveyed fluid or by an auxiliary fluid contained in the annular chamber 14.

As schematically illustrated in FIG. 6, in this case the leakage detector 38 comprises a switch 40 formed by a hollow body having a threaded spigot 42 for sealing connection to an aperture 36 of the chamber 14; within the body is defined a chamber in fluid communication with the chamber 14, in which is disposed an insulator member 46 interposed between two electrical contacts 48, 50 forming part of an electric supply circuit to an alarm indicator schematically indicated with the reference numeral 44.

The said insulator member 46 is constituted for example by a material which breaks down upon contact with the conveyed fluid or with an auxiliary fluid contained in the chamber 14. The term "breakdown" is intended to mean a material soluble in the conveyed fluid (or auxiliary fluid) or a material the mechanical strength properties of which can vary upon contact with such fluids. Thus, for example, the insulator 46 can be made of camphor or similar insulating material soluble in oil or, for example, natural rubber which is not oil-resistant and which becomes soft upon contact with oil. At least one of the electrical contacts 50 is associated with resilient means 52 intended to urge the contact associated with it towards the other contact, causing closure of the electrical circuit upon breakdown of the insulator member 46.

Insulator elements which inflate upon contact with the fluid causing contact between the two movable contacts can also be used as the fluid-operated switch.

Alternatively, the insulator member 46 can be constituted by a normally insulating material such as, for example absorbent paper or filter paper, which can permit the passage of electric current between the two contacts when immersed in or impregnated with the conveyed fluid or with an auxiliary fluid. Conveniently, in this case, when the conveyed fluid is oil, the chamber 14 may include an auxiliary fluid conductor such as an electrolyte, or a substance which can dissolve (or otherwise break down) in the conveyed fluid to render it conductive. In this case there are provided valve means associated with the aperture 34, operable to permit the inlet of the conveyed fluid into the chamber 14 and to prevent the escape of the auxiliary liquid, and valve means associated with the aperture 36 which allow access of the auxiliary fluid to the internal cavity within the switch 40 only upon ingress of the conveyed fluid into the chamber 14.

The fluid-operated switch may also be a switch comprising, in a chamber communicating with the chamber 14, a pair of electrical contacts normally spaced from one another in such a way as to maintain the electrical circuit open, in which at least one of these contacts is movable and capable of closing the electrical circuit as a result of the thrust generated by the expansion of a member which inflates when contacted by the conveyed fluid or the auxiliary fluid.

Such an embodiment is shown in FIG. 7, wherein the sensor means consist of a fluid operated switch 80 having a steel housing 82 hermetically sealed with a threaded cup 84. The housing contains two non-conductive disks 86, separated by a spring 88. Each disk has an electrode 90 in the middle thereof; a wick material, 92, which is swellable by liquid, is located behind its disk. The sensor is activated by liquid; the trigger is the encapsulated wick material which swells as it adsorbs liquid and forces the disks together. When the disks contact each other, the electrode 90, connected to wire cables 94 bridge an electrical circuit. Because the reaction of the wick material to liquid triggers the sensor, no pressure is required for activation.

The alarm indicator device 44 can be associated, as illustrated in FIG. 4, with a threaded aperture of the annular element 12; the hose sensor and alarm indicator device may be grounded through the steel body of the hose connector and the positive terminals of the sensors and the alarm are connected with a wire 96 extending through the annular chamber 14 or embedded into the wall of the annular element 12. Preferably the hose sensor and the visual alarm are positioned 180° apart on the hose connector, with the sensor at the bottom and the visual alarm on top. In this configuration the sensor is immediately activated when the first quantity of liquid passes into the sensor and absorbs into the wick material. It is not necessary that the path between the two carcasses of the annular chamber in the hose connector be full or pressurized to trigger the sensor.

The alarm indicator 44 may consist of a steel container including a battery pack schematically indicated 56, which, when the circuit is closed, provides an electric current to an optical or acoustic indicator member. When an optical indicator is used, it is preferably a miniature winker light consisting of a steel container comprising a battery pack 56, electronic circuits (not shown) which generate flash pulses at a pre-determined frequency and a flash bulb 98.

Alternatively, the alarm indicator may be disposed in a position remote from the flexible hose to which the switch 40 of the leakage detector 38 is associated.

In another embodiment the leakage detector 38 comprises a dry battery 58 disposed within a sealed casing 60 provided with a threaded attachment spigot 62 for connection to a threaded hole 36 of the chamber 14 and having an aperture 64 which puts a chamber within the said casing 60 in which the battery 58 is disposed, into fluid communication with the chamber 14. The dry battery 58, of type known per se, can be activated when the conveyed fluid, or preferably an auxiliary fluid, constituted in this case by a saline solution, penetrates into the interior of the carcass 60 by the action of the conveyed fluid escaped from the first carcass 6.

The battery 58 is connected in an electrical supply circuit to an optical or acoustic alarm indicator 44a which, like the previously described alarm indicator 44, can be connected directly to the annular element 12.

In another embodiment the leakage detector device 38 can be constituted by a body of sintered material in fluid communication with the chamber 14 and capable of changing colour to provide a visual indication of leakage when contacted by the conveyed fluid or an auxiliary fluid contained in the chamber 14.

Naturally, the annular element 12 and the leakage detector device 38 associated with it, can be disposed at each end of the flexible hose or at only one of its ends. The flexible hose may be made by a process involving vulcanisation of both the first and the secondary carcass 6, 16 onto the tubular connector 2. For example, the hose may be made utilising a single vulcanisation operation involving both the first and the secondary carcass 6, 16 by leaving a polyamide bandage in place on the first carcass 6 (to be vaporised away) or alternatively vulcanisation of the first carcass 6 and the tubular member 18 onto the annular elements 12 may be performed first and subsequently the secondary carcass 16 vulcanised onto the tubular attachment element 18.

What is claimed is:

1. A dual carcass-flexible hose comprising:
   a first carcass for conveying a fluid and a secondary carcass surrounding the first carcass in such a way as to define a space for retention of fluid, the first and secondary carcass being connected at each end to a metal tubular connector having a flange at one end thereof,
   a metal annular element surrounding said tubular connector adjacent said flange and defining, between a wall of the annular element and the outer surface of the connector, an annular chamber in fluid communication with the space between the first and secondary carcass, and
   a leakage detector device for detecting leakage of the conveyed fluid from the first to the secondary carcass, disposed in fluid communication with said annular chamber, said leakage detector device comprising sensor means adapted to generate a signal when contacted by fluid irrespective of threshold values of the radial expansion of the secondary carcass or of the pressure of fluid in the secondary carcass.

2. A flexible hose according to claim 1, in which the said leakage detector device comprises a level indicator operable to detect the level of liquid in the said annular chamber and to emit an alarm signal when the level of fluid exceeds a predetermined threshold.

3. A flexible hose according to claim 1, in which the said leakage detector device comprises a switch disposed in fluid communication with said annular chamber and operated by the fluid to close an electric current supply circuit to an alarm device upon ingress of fluid into said annular chamber.

4. A flexible hose according to claim 3, in which the said switch comprises an insulator member which can break down by contact with a fluid, interposed between a first and a secondary contact of the switch, at least one of the contacts of the switch having associated resilient means tending to urge it towards the other contact in such a way that the breakdown of the said insulator member causes closure of the electric circuit and the emission of an alarm signal by the said alarm indicator device.

5. A flexible hose according to claim 4, characterised in that the said insulator element broken down by the fluid is constituted by a material which is susceptible of losing its mechanical strength properties when contacted with or impregnated by the fluid.

6. A flexible hose according to claim 4, in which the said material which can be broken down by the fluid is a material soluble in the conveyed fluid or in an auxiliary fluid.

7. A flexible hose according to claim 3, in which the said switch includes an insulator member interposed between first and secondary electrical contacts and capable of acting as a conductor element when impregnated with or immersed in the conveyed fluid or an auxiliary fluid, in such a way as to close the electrical supply circuit to the said alarm device.

8. A flexible hose according to claim 3, in which said switch comprises a first and second electrical contact, at least one of which is movable relatively to the other, a fluid swellable trigger member cooperating with the at least one movable contact, the trigger member being susceptible to expand when contacted by fluid, to urge the movable contact against the other contact to close an electric supply circuit to an alarm device against the action of resilient means interposed between said contacts.

9. A flexible hose according to claim 1, in which said annular chamber contains an auxiliary fluid, non-return valve means being provided which allow the access of the conveyed fluid into the said annular chamber and non-return valve means which allow access of said auxiliary fluid to the leakage detector device when moved by the conveyed fluid.

10. A flexible hose according to claim 9, in which the said auxiliary fluid is an electrolyte.

11. A flexible hose according to claim 1, in which the said annular chamber includes a substance soluble in the conveyed fluid which can be dissolved in the conveyed fluid to render it electrically conductive.

12. A flexible hose according to claim 1, in which the said leakage detector device comprises a dry battery disposed in a carcass defining a chamber in which the said battery is disposed in fluid communication with the said annular chamber, the said dry battery being connected in an electric current supply circuit to an alarm indicator device and being capable of being activated to provide an electrical current when immersed in the conveyed fluid or an auxiliary fluid.

13. A flexible hose according to claim 12, in which the said auxiliary fluid is an electrolyte contained in the said annular chamber.

14. A flexible hose according to claim 1, in which the said leakage detector device is constituted by a sintered material contained in a carcass communicating with the said annular chamber and capable of changing colour upon contact with the conveyed fluid or an auxiliary fluid.

15. A flexible hose according to claim 1, comprising a tubular element fixed to the said annular element and acting as an attachment member for the said secondary carcass.

* * * * *